March 17, 1964  W. WAIDELICH  3,124,987
MICROMETER CROSS SLIDE STOP FOR SECOND OPERATION IN MACHINE
Filed March 19, 1962
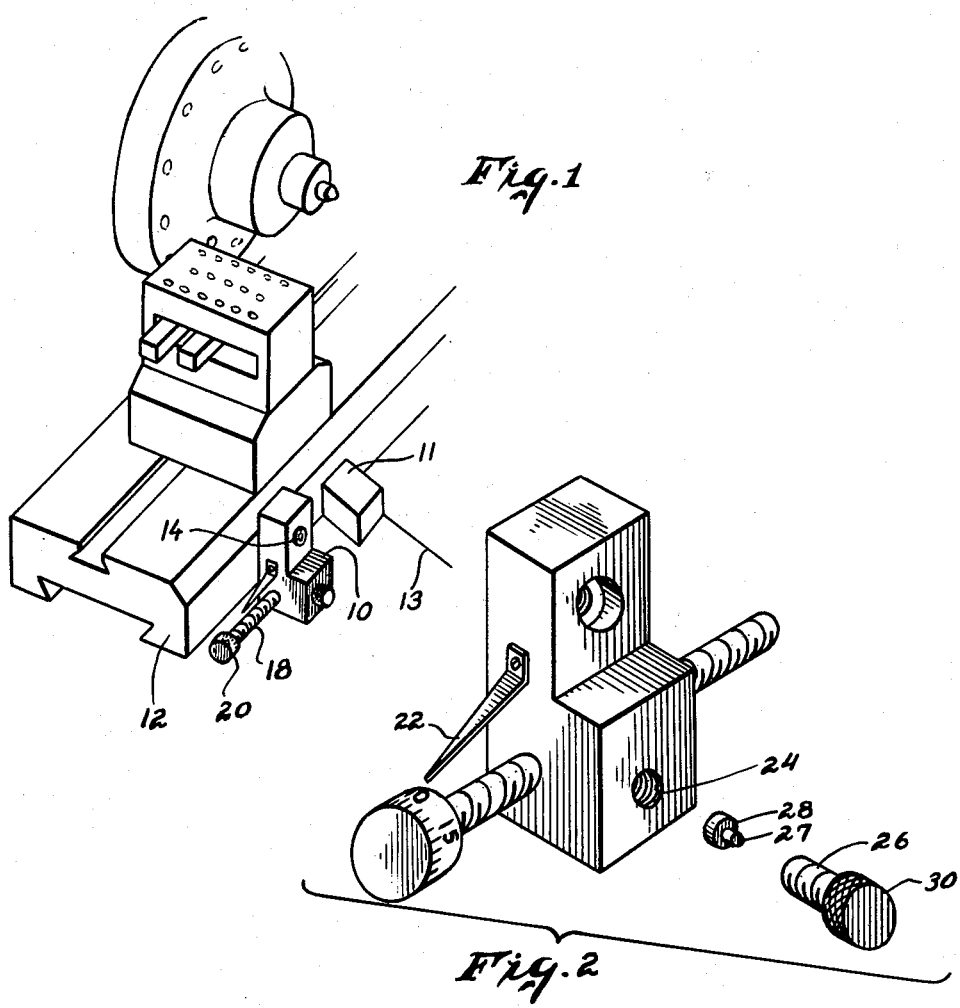
INVENTOR.
WILBERT WAIDELICH
BY
ATTORNEYS

United States Patent Office 3,124,987
Patented Mar. 17, 1964

3,124,987
MICROMETER CROSS SLIDE STOP FOR SECOND
OPERATION IN MACHINE
Wilbert Waidelich, 46 Havemeyer Lane, Commack, N.Y.
Filed Mar. 19, 1962, Ser. No. 180,515
2 Claims. (Cl. 82—34)

This invention relates to a second operation machine and, more particularly, relates to an adjustable stop therefor.

In second operation machines, the tool is driven radially into the work by a cross slide tool carrier. The depth of tool insertion into the work is regulated by a threaded stop.

Setting the stop is unduly complex since the operator must take a cut into the work, measure the dimensions of the cut piece, and adjust the stop. This sequential operation is repeated until the stop is properly adjusted and locked. This procedure results in relatively long set-up time and, since it is inevitable that an excessive cut will be taken during this procedure results in spoilage of partially machined work.

The sequential setting operation is rendered more difficult by the usual locking arrangement. The stop is locked in position by a brass stud driven by a set screw into frictional engagement with the threads on the stop. The brass stud distorts and jams the threads of the stop so that movement of the stop must be made with the aid of a wrench. When sufficient force is exerted to overcome the static friction of the jammed stop, the stop will jump, rendering precise movement thereof difficult.

It is, therefore, the primary object of this invention to provide a stop which is compatible in accordance with the necessary cut to be taken.

In accordance with this object, there is provided in a preferred embodiment of this invention, a stop having a body which is removably securable to the cross slide of a second operation machine. A threaded shaft extends through the body in the direction of movement of the cross slide and is threadably engaged within the body. The end of the threaded shaft engages a fixed stop on the machine frame thereby to stop movement of the cross slide. A calibrated dial is provided on the end of the threaded shaft thereby to change the stop position in measurable increments of distance of movement of the end of the stop.

A second aperture is provided in the body to threadably receive a locking device consisting of a threaded shaft on the end of which is mounted a Teflon button. The locking device may be driven so that the Teflon button engages the threads of the stop mechanism thereby to lock the threaded shaft of the stop assembly in any desired position.

Having briefly described the invention, it will be described in detail, along with additional advantages and objects thereof, in the following detailed description of the invention which may best be understood by reference to the accompanying drawings, of which:

FIG. 1 is a perspective view of the adjustable stop in accordance with the present invention mounted on the cross slide of a second operation machine;

FIG. 2 is a partially exploded perspective view of the adjustable stop shown in FIG. 1;

FIG. 3 is a plan view of the stop screw shown in FIG. 2; and

FIG. 4 is a partially sectioned view of the lock screw.

In the figures, there is shown a cross slide stop comprising a stop body 10 which is secured to the cross slide 12 of second operation machine by bolt 14. It will be noted that the micrometer stop can be installed without modification of conventional second operation machines.

A stop block 11 is proivded on the frame 13 of the machine to limit movement of the cross slide as the end of micrometer screw 18 hits the block. The screw 18 extends through the body 10 and is threadably engaged therewith. A calibrated drum 20 is provided on the screw 18 which drum is calibrated in thousandths of an inch in movement of the shaft 18. On many second operation machines, the edge of the cross slide 12 may be utilized as the index marker for the drum since the drum falls beneath the cross slide. However, on other machines, an index marker 22 may be provided.

A threaded bore 24 is provided in the body 10, which intersects the threaded aperture through which shaft 18 extends. A lock screw assembly comprising a threaded shaft 26 and a Teflon button 28 is threadably received in bore 24. The Teflon button is provided with a protruding shaft 27 received in bore 29 in shaft 26. The lock screw assembly may be screwed into bore 24 until the button 28 engages the threads of shaft 18 thereby to lock the shaft in any predetermined position. It has been found that finger pressure on knurled drum 30 is sufficient to lock the shaft 18 in position. As opposed to the usual locking arrangement using a lock screw which drives a brass plug into the threads of shaft 18, the Teflon button provides the requisite locking strength under finger pressure alone instead of the wrench pressure formerly found necessary. In addition, when the locking screw is backed off the stop screw can be easily rotated by hand. In the use of a brass bushing, it usually jams the threads making it mandatory to use wrenches to turn both the locking and adjustment screws. The high static friction of the jammed threads causes the screws to jump, making precise adjustment impossible.

In operation the stop screw 18 may be backed off or turned to a convenient initial indicia. The cross slide may then be driven so that the tool engages the work and the depth of cut measured by a micrometer. The difference between the desired cut and the cut actually taken may then be used to compute the additional needed insertion depth of the tool into the work, which can be set by movement of the drum 20 which is marked by indicia 32 representing thousandths of an inch of movement of the end of shaft 18. The shaft 18 may then be locked in this position by finger pressure on the knurled drum 30. In this manner, the second operation machine is now ready for production runs. Thus, the initial setting up of the machine is considerably shorter and more accurate. In addition, the drum 20 is calibrated so that undercuts can be prevented. Such undercuts are particularly costly in second operation machines, since the work is not stock, but partially machined material, and thus, the spoilage value is quite high.

This invention may be variously modified and embodied within the scope of the subjoined claims.

What is claimed is:

1. An adjustable stop for a second operation machine having a cross slide and a stop block on the frame thereof, which comprises a body, means for mounting said body on said cross slide, said body being provided with a threaded bore extending in the direction of movement of said cross slide, a threaded shaft in threaded engagement with the threads of said bore, one end of said shaft positioned to engage said stop block, a drum on the end of said shaft, said drum carrying indicia relating to the axial advance of said shaft for a predetermined angular rotation thereof, said body having a second bore extending into said first threaded bore along a diameter of said first bore, said second bore having internal threads therein, and a locking shaft threadably received within said second bore, a Teflon button mounted on one end of said locking shaft to engage the threads of said threaded shaft to lock said threaded shaft in a predetermined position, said locking shaft being provided with a knurled drum on the other end of said locking shaft to enable rotative driving of said locking shaft by finger tenson on said knurled drum, whereby said locking shaft may be repeatedly driven into locking engagement with said threaded shaft to frictionally hold said shaft in a selected position by finger tension and retracted to release said threaded shaft enabling rotation of said threaded shaft by finger tension applied to said indicia-carrying drum thereon.

2. An adjustable stop in accordance with claim 1 which includes an index marker for said indicia-carrying drum.

References Cited in the file of this patent

UNITED STATES PATENTS

| | | |
|---|---|---|
| 938,483 | Hanson | Nov. 2, 1909 |
| 1,154,107 | Fay | Sept. 21, 1915 |
| 2,032,598 | Shaw | Mar. 3, 1936 |
| 2,984,113 | Ransom | May 16, 1961 |